(12) United States Patent
Gadonniex et al.

(10) Patent No.: US 7,147,369 B2
(45) Date of Patent: Dec. 12, 2006

(54) TEMPERATURE SENSOR

(75) Inventors: Dennis M. Gadonniex, Bradenton, FL (US); Steven Wharton, North Port, FL (US); Jeffrey L. Philbin, Sarasota, FL (US)

(73) Assignee: Stoneridge, Inc., Warren, OH (US)

( * ) Notice: Subject to any disclaimer, the term of this patent is extended or adjusted under 35 U.S.C. 154(b) by 0 days.

(21) Appl. No.: 11/091,725

(22) Filed: Mar. 28, 2005

(65) Prior Publication Data

US 2006/0215731 A1    Sep. 28, 2006

(51) Int. Cl.
*G01K 1/10* (2006.01)
(52) U.S. Cl. ...................... 374/208; 374/185
(58) Field of Classification Search ........... 374/145, 374/185, 208; 136/230
See application file for complete search history.

(56) References Cited

U.S. PATENT DOCUMENTS

| 4,016,758 | A | | 4/1977 | Taylor | |
|---|---|---|---|---|---|
| 4,265,117 | A | * | 5/1981 | Thoma et al. | 374/165 |
| 5,046,857 | A | * | 9/1991 | Metzger et al. | 338/28 |
| 5,352,308 | A | * | 10/1994 | Tomihara et al. | 156/66 |
| 5,660,473 | A | * | 8/1997 | Noma et al. | 374/145 |
| 5,844,135 | A | * | 12/1998 | Brammer et al. | 73/118.2 |
| 6,435,017 | B1 | | 8/2002 | Nowicki, Jr. et al. | |
| 6,829,820 | B1 | * | 12/2004 | Adachi et al. | 374/208 |

FOREIGN PATENT DOCUMENTS

WO      WO 93/09416      5/1993

* cited by examiner

*Primary Examiner*—G. Bradley Bennett
(74) *Attorney, Agent, or Firm*—Burgess Law Office, PLLC

(57) ABSTRACT

A temperature sensor used to monitor coolant and an automobile coolant system. The temperature sensor includes a one-piece housing having a sensor portion and a connector portion. A sensor assembly, including a sensor having a pair of terminals connected thereto is disposed within the housing. The sensor portion includes a sensor tip having a configuration conducive to improving thermal transfer from the coolant through the sensor tip to the sensor. A thermally conductive material may also be used to improve thermal or heat transfer to the sensor.

28 Claims, 5 Drawing Sheets

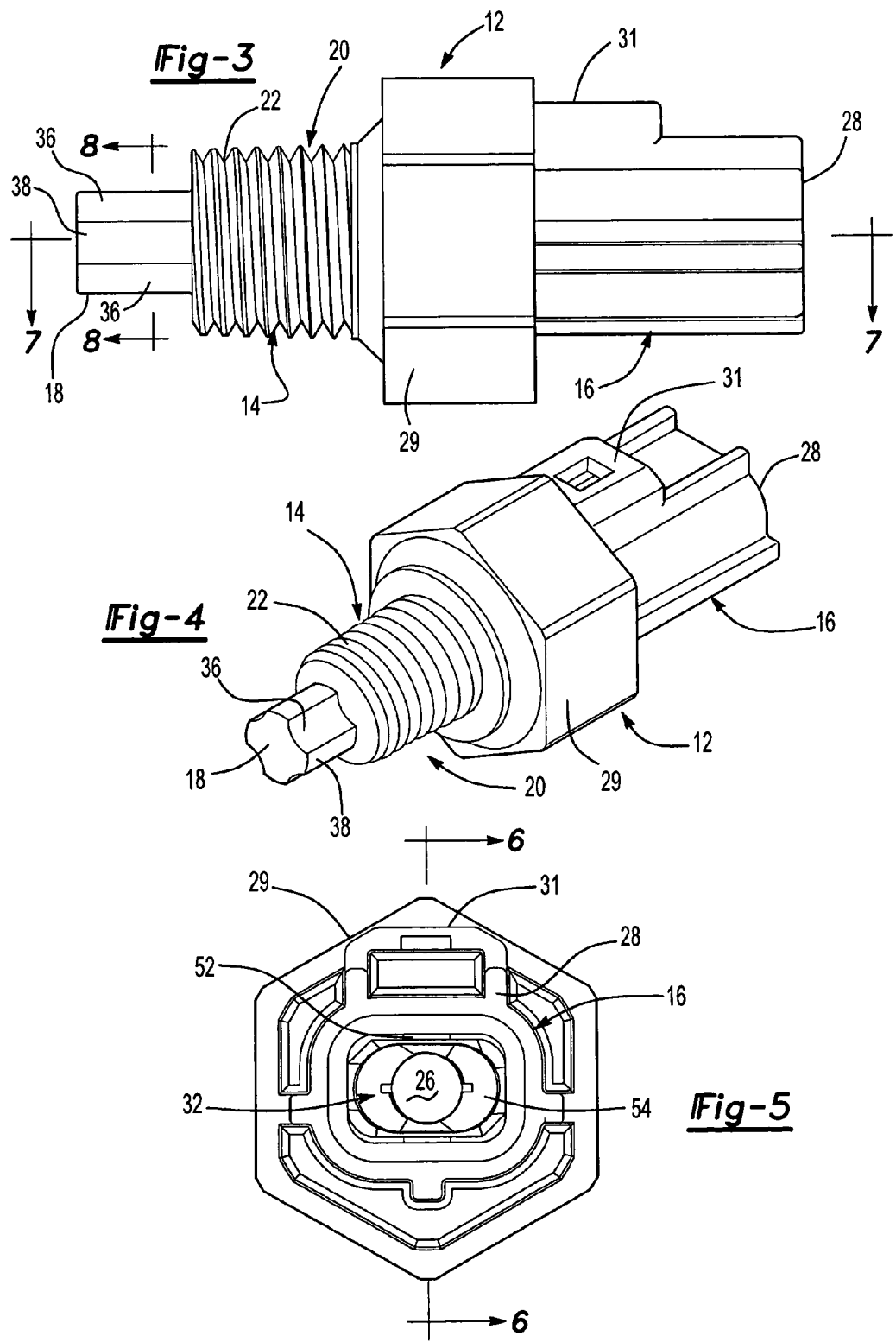

_US 7,147,369 B2_

TEMPERATURE SENSOR

CROSS-REFERENCE TO RELATED APPLICATIONS

Not Applicable.

BACKGROUND OF THE INVENTION

1. Field of the Invention

The present invention relates generally to a temperature sensor; and more specifically, to a coolant temperature sensor that monitors the temperature of a cooling fluid used with an internal combustion engine.

2. Description of Related Art

Currently, automotive vehicles use an internal combustion engine as a power plant for the vehicle. Internal combustion engines generate friction, which correspondingly generates heat. To dissipate the heat and maintain proper engine temperature, many automotive vehicles utilize a liquid cooling system. The liquid cooling system operates by circulating coolant through the engine to collect the heat and then through a radiator to dissipate it. One component of the cooling system includes a cool and temperature sensor that provides coolant temperature feedback or information to the vehicle operator. In addition, the temperature sensor also provides information to the vehicle control module, which operates the cooling fans and other engine operating parameters based on the temperature sensor signal.

An automotive engine cooling system is a harsh environment due to the corrosive behavior of the fluids used and the temperature extremes. A temperature sensor must be able to survive the operating conditions, accurately detecting temperature, respond quickly to temperature changes, maintain a liquid tight seal and have a long life.

Traditional coolant temperature sensors typically include a variable resistor type sensor or often referred to as a thermistor. The sensor is positioned in a two-piece housing having a brass component that is either machined or stamped and a separately molded plastic connector component. The plastic connector component is connected to the brass component using various methods. Typically, a gasket seals the interface or joint between the brass component and the plastic connector component. After assembly of the housing, the sensor is typically inserted into the housing and secured in place.

In addition, U.S. Pat. No. 5,844,135 illustrates a coolant temperature sensor using a two-piece plastic assembly. The temperature sensor includes an integrally formed plastic body including a sensor part and an adjoining plug part. A housing of temperature resistant plastic is directly injection molded over and surrounds the sensor part 19.

SUMMARY OF THE INVENTION

Accordingly, the present invention is a temperature sensor that monitors the temperature of a medium and relays a signal corresponding to the temperature of the medium back to a control or display unit. The temperature sensor includes a one-piece plastic housing having a sensor portion and a connector portion. A sensor element is disposed within the sensor portion of the housing. A pair of terminals are connected on one end thereof to the sensor element. The terminals are supported in the connector portion of the housing.

In addition, the temperature sensor may include a sensor tip having a configuration conducive to improving thermal transfer from the medium through the sensor tip to the sensor element. A thermally conductive material may also be used to improve the thermal or heat transfer to the sensor element.

In a further embodiment, the sensor includes a plurality of threads located on an outer surface of the housing for use in mounting or securing the temperature sensor. In some instances, application of a microencapsulated thread compound helps secure the temperature sensor in place.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a side view of the housing of the temperature sensor according to the embodiment of the present invention illustrated in FIG. 1;

FIG. 4 is a perspective view showing the sensor portion of the housing of the temperature sensor according to the embodiment of the present invention illustrated in FIG. 1;

FIG. 5 is an end view of the housing of the temperature sensor according to the embodiment of the present invention illustrated in FIG. 1;

DETAILED DESCRIPTION OF THE PREFERRED EMBODIMENTS

Figure 1:
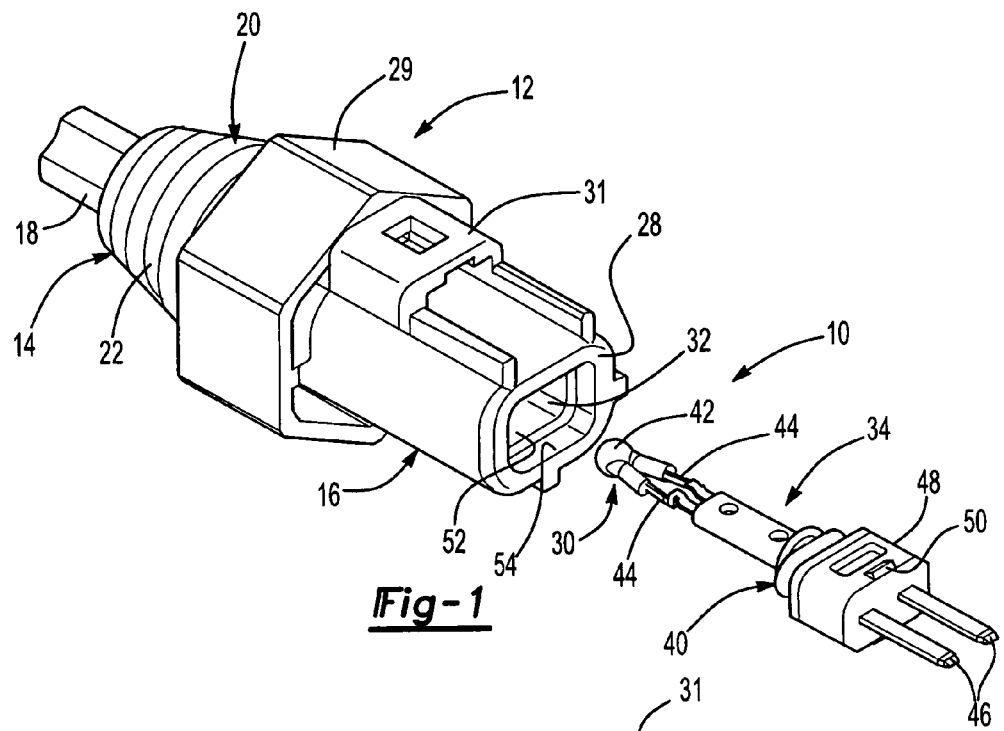
FIG. 1 is an exploded perspective view of a temperature sensor according to one embodiment of the present invention.
Figure 2:
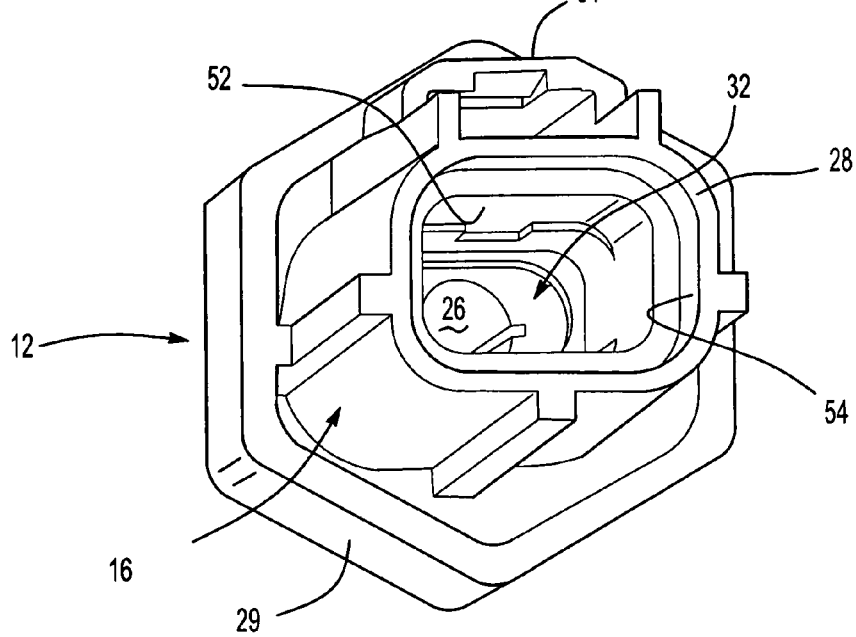
FIG. 2 is a perspective view of the connector portion of the housing of the temperature sensor according to the embodiment of the present invention illustrated in FIG. 1.
Figure 6:
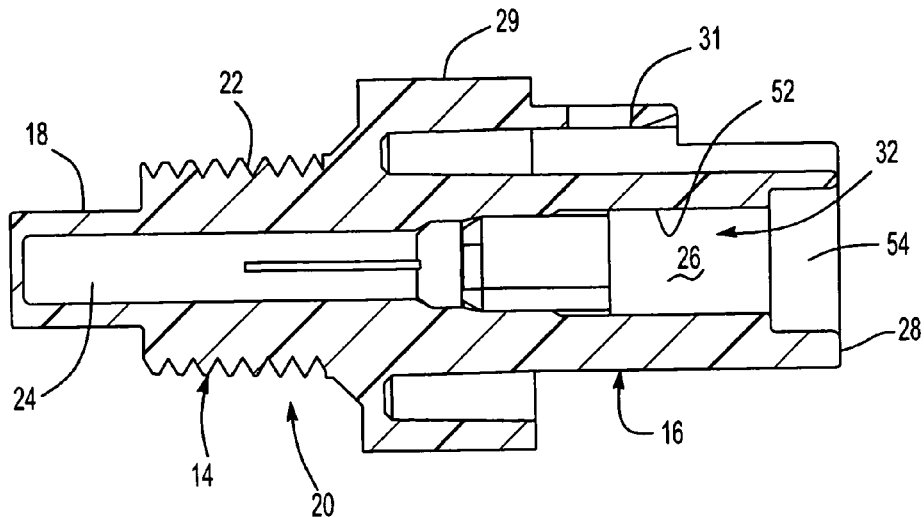
FIG. 6 is a cross sectional view of the housing of the temperature sensor according to the embodiment of the present invention illustrated in FIG. 1 taken along lines 6—6 of FIG. 5.
Figure 7:
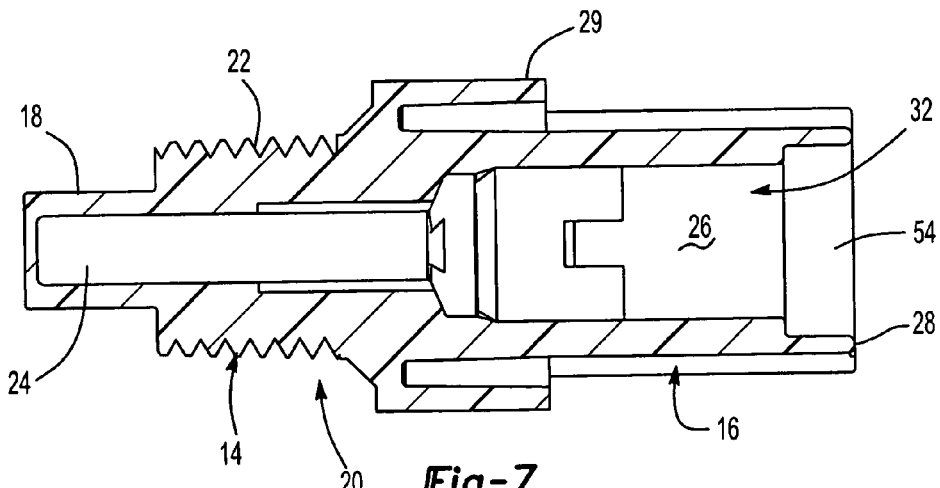
FIG. 7 is a cross sectional view of the housing of the temperature sensor according to the embodiment of the present invention illustrated in FIG. 1 taken along lines 7—7 of FIG. 3.
Figure 8:
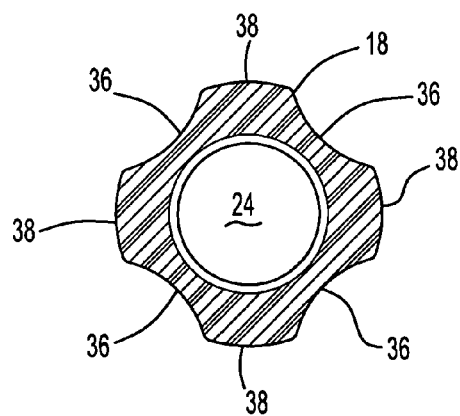
FIG. 8 is a cross sectional view of the housing of the temperature sensor according to the embodiment of the present invention illustrated in FIG. 1 taken along lines 8—8 of FIG. 3.

FIGS. 1–9 illustrate a temperature sensor 10 according to one embodiment of the present invention. The temperature sensor 10 includes a one-piece housing 12. The one-piece housing 12 includes a sensor portion 14 and a connector portion 16. The sensor portion 14 includes a sensor tip 18 located at an end of the housing 12 opposite the connector portion 16. The sensor portion further includes a mounting or attachment assembly, seen generally at 20, used to secure the temperature sensor 10 such that the sensor tip 18 is located in and senses the temperature of a selected fluid, for example, coolant located in an engine cooling system of an automotive vehicle. As shown in the embodiment of FIG. 1, the mounting or attachment assembly 20 includes a plurality of tapered threads 22, commonly referred to as NPT, located on an outer surface of the housing 12. The threads 22 mate with corresponding threads located in a mounting aperture. The housing 12 also includes a drive portion, seen generally at 29, shown herein as a hexagonal shaped member that cooperates with a suitable tool to rotate the housing 12 to install it in the mounting aperture.

The one-piece housing 12 includes a chamber 26 extending inward from the end 28 of the connector portion 16 through the housing 12 to the sensor tip 18. A sensor cavity 24 located in the sensor tip 18 forms a part of the chamber 26. The chamber 26 performs two functions; it houses a sensor element 30 in the sensor cavity 24 located at the sensor tip 18 and also provides a mounting socket 32 configured to receive a connector (not shown) that connects the temperature sensor 10 to a monitoring system or control module. The connector portion 16 also includes a retaining assembly, seen generally at 31, that retains or couples the connector to the housing 12 when the connector is inserted into the mounting socket 32.

The housing 12 is molded or formed in one piece from a homogeneous plastic or polymeric material. When used to sense coolant temperature in an automotive coolant system, it is imperative that the plastic or polymeric material selected for the housing 12 is suitable; i.e., it should have the ability to withstand the temperature and chemical makeup of the coolant without degrading or breaking down. In particular, the plastic or polymeric material should be glycol resistant as glycol is one of the main components in automotive coolants. Polyphthalamide and polyethersulfone are plastic or polymeric materials having suitable temperature and coolant resistant properties. In addition, to provide structural strength and rigidity, some polymers or plastics may require the use of glass or other fibers as a filler. When using polyphthalamide and polyethersulfone, the amount of glass fiber may vary between 30 percent and 60 percent by volume.

The present invention enables manufacturing or forming the one-piece housing 12 using an injection molding process that forms both the sensor portion 14 and connector portion 16 as a single unit or piece having an interior chamber 26. A sensor assembly 34, including the sensor element 30, is inserted into and secured within the chamber 26 after forming the one-piece housing 12.

As illustrated in FIG. 4, the sensor tip 18 has a geometry or configuration that helps increase the heat transfer from the coolant through the sensor tip 18 to the sensor element 30. The geometry is such that it effectively increases the surface area of the sensor tip 18 near the sensor element 30. In particular, the sensor tip 18 is shown having a generally cylindrical configuration having a plurality of longitudinally extending flutes 36. The flutes 36 help define a plurality of heat exchanging fins 38 that improve heat transfer. It should be understood that the disclosed sensor tip 18 configuration is but one example and that other tip configurations, including grooves, channels or projecting members that improve heat transfer rates may also be used.

As set forth above, the sensor assembly 34 is inserted in the one-piece housing 12 after the one-piece housing 12 is formed. In the preferred embodiment, the sensor assembly 34 is a dual terminal thermistor 40 including a thermistor 42 having a pair of leads 44. The thermistor 42 is a negative temperature coefficient thermistor having a resistor element wherein the resistance decreases with an increase in temperature. A pair of terminals 46 secured in a body 48 are connected on one end thereof to the respective leads 44 of the thermistor 42. Accordingly, the preassembled dual terminal thermistor 40 is inserted within the chamber 26 of the one-piece housing 12 until the shoulder 49 of the body 48 engages an inwardly extending protrusion or abutment 51. The body 48 of the dual terminal thermistor 40 includes a barb or locking projection 50 that engages an interior surface 52 of the chamber 26 to secure the dual terminal thermistor 40 within the chamber 26. Thus, the thermistor 42 is positioned in the sensor cavity 24 located in the sensor tip 18 and the terminals 46 are located in the connector portion 16 and extend outwardly into the open end 54 of the connector portion 16.

A thermally conductive material 56 may be applied inside the sensor cavity and about the thermistor 42 to improve thermal conductivity or heat transfer between the sensor tip 18 and the thermistor 42. In the preferred embodiment, the thermally conductive material 56 is a room temperature vulcanizing silicone having suitable thermal conductive additives. The silicone is injected into the chamber 26 and corresponding sensor cavity 24 prior to inserting the dual terminal thermistor 40. The thermally conductive material 56 also performs a secondary function in that it helps to support the sensor element 30 within the sensor cavity 24.

Figure 9:
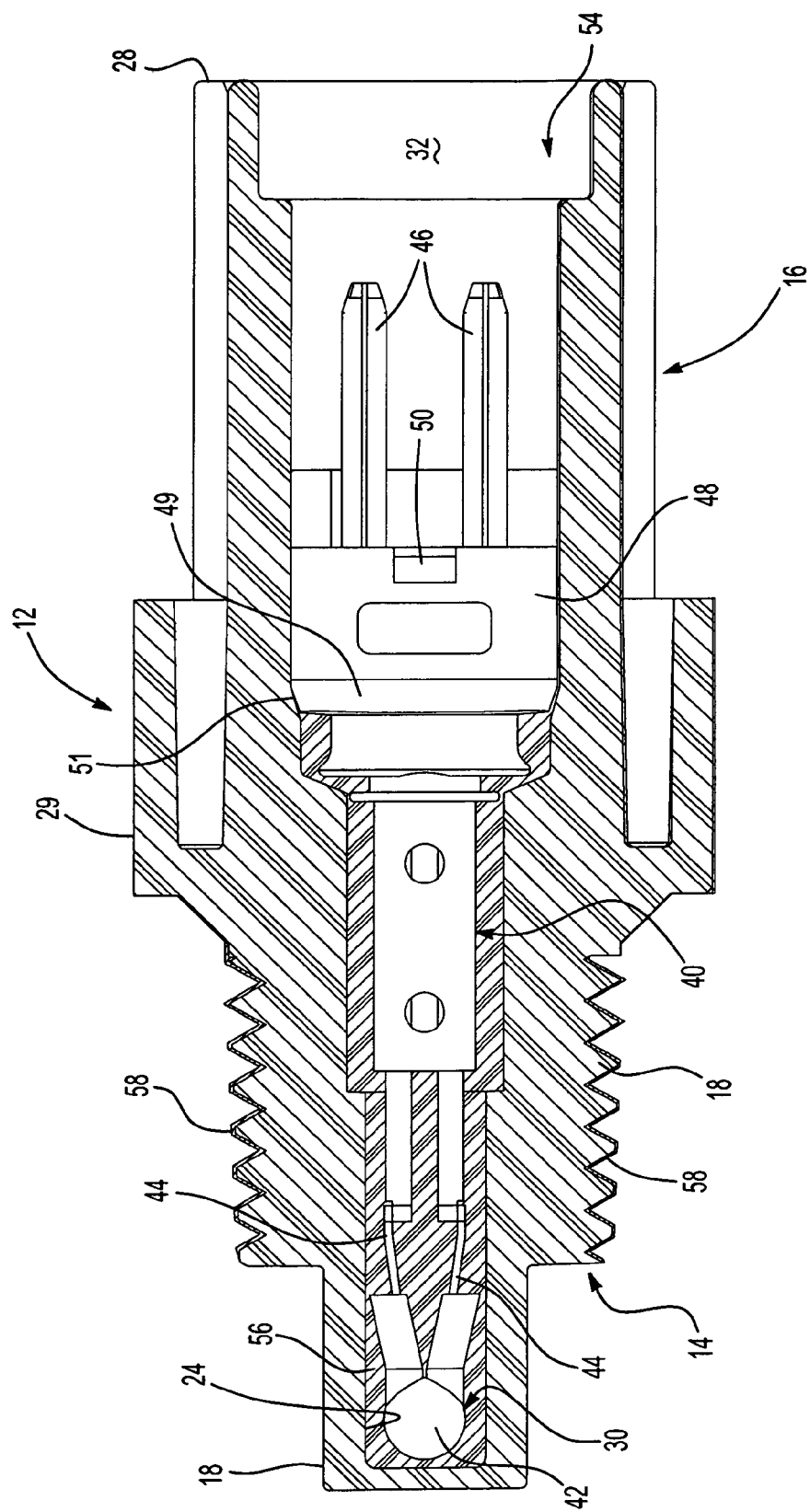
FIG. 9 is a partial cross sectional view illustrating the sensor assembly located within the housing of the temperature sensor according to the embodiment of the present invention illustrated in FIG. 1.

As illustrated in FIG. 9 a microencapsulated thread compound 58 may be applied to the threads 22 of the housing 12 to increase torque retention and sealing of the housing 12. The thread compound 58 may include a glass encapsulated two-part epoxy that remains inert until the shearing action of engagement between the threads 22 of the housing 12 and a correspondingly threaded aperture for receiving the temperature sensor 10 located in the coolant system causes some of the microcapsules to break or rupture allowing the epoxy to mix and cure.

Figure 10:
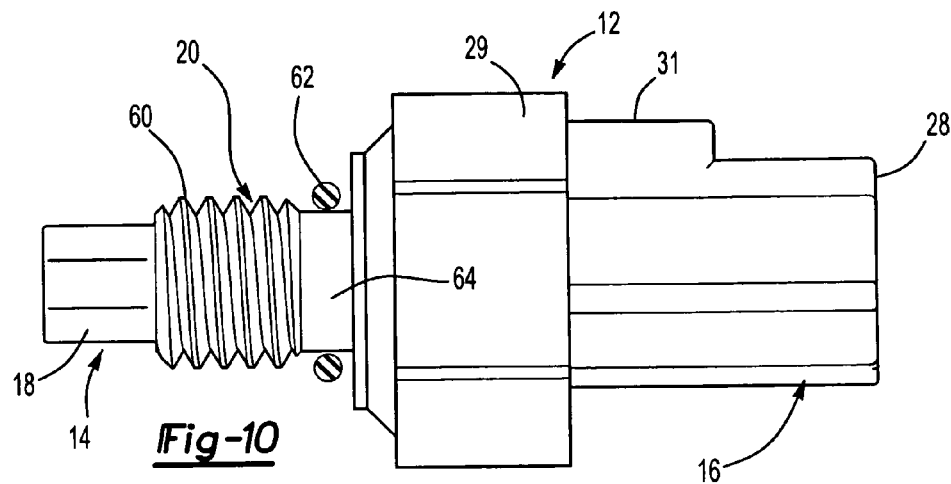
FIG. 10 is an alternative embodiment of the housing of a temperature sensor according to the present invention.
Figure 11:
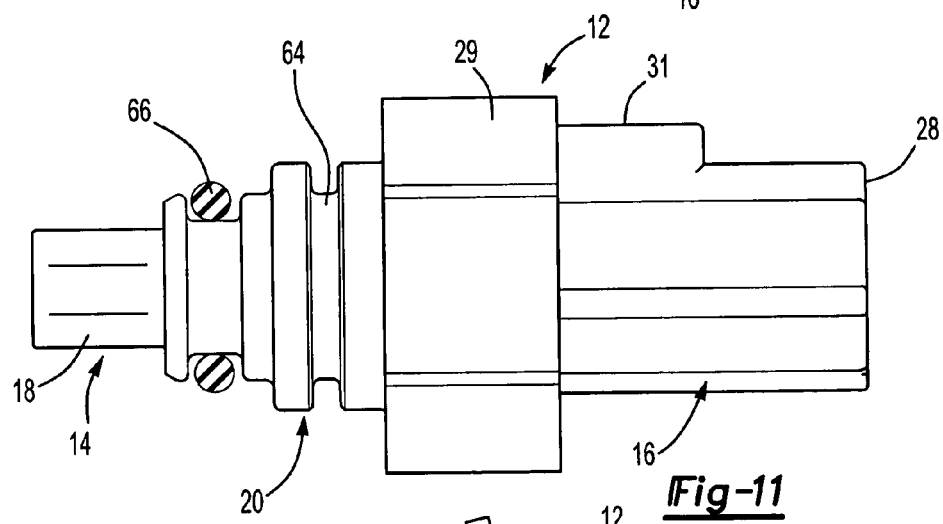
FIG. 11 is a further embodiment of the housing of a temperature sensor according to the present invention.
Figure 12:
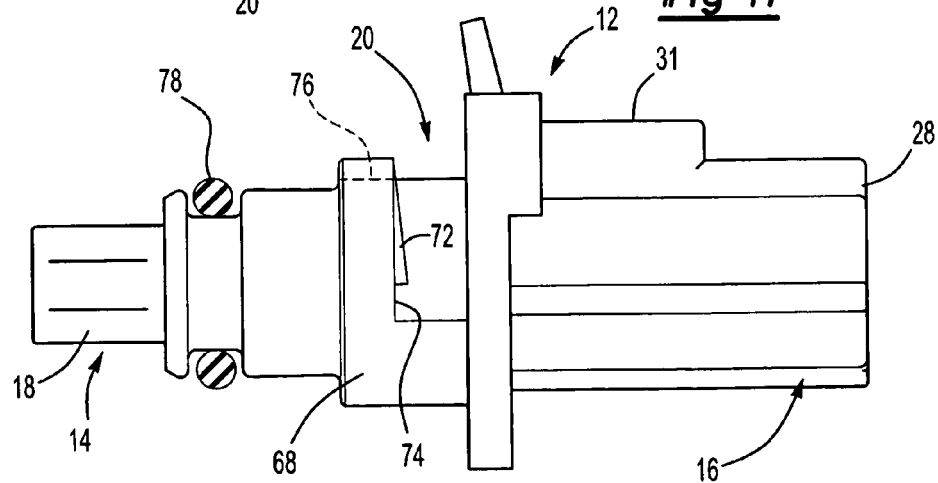
FIG. 12 is another embodiment of the housing of a temperature sensor according to the present invention.

FIGS. 10–12 show additional embodiments of the temperature sensor 10 having various attachment assemblies 20. As shown in FIG. 10, the attachment assembly 20 includes a plurality of straight mechanical pipe threads 60 located on an outer surface of the sensor portion 14. An O-ring 62 is disposed about an annular portion 64. The O-ring 62 functions as a seal member to seal the sensor portion 14 of the housing 12 when the temperature sensor 10 is installed in the coolant system.

FIG. 11 shows a further embodiment of the temperature sensor 10 wherein the attachment assembly 20 includes an annular groove 64 sized to receive a clip or bracket (not shown) used to secure the temperature sensor 10 in place. Again, an O-ring 66 functions as a seal member to prevent leakage when the temperature sensor 10 is installed in the coolant system.

FIG. 12 illustrates an additional embodiment of an attachment assembly 20 using a twist and lock arrangement, seen generally at 68. The twist and lock arrangement 68 includes an outwardly extending flange 70 having a ramp surface 72 terminating at a seat 74. A notch 76 located in the flange 70 receives an inwardly extending tab (not shown) in the mounting aperture. Accordingly, as the housing 12 is rotated, the tab rides along the ramp surface 72 until it reaches and falls into the seat 74 whereby it secures the housing 12 and corresponding temperature sensor 10 in place. Once again, an O-ring 78 is used as a seal member.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A temperature sensor comprising:
   a one-piece plastic housing said plastic selected from the group of polyphthalamide with a glass fiber content of 30 percent to 60 percent by volume, or polyethersulfone with a glass fiber content of 30 percent to 60 percent by volume, said housing having a sensor portion and a connector portion;
   a sensor element disposed in said the sensor portion of said housing; and
   a pair of terminals connected on one end thereof to said the sensor element and supported in said connector portion of said housing.

2. A temperature sensor comprising:
   a one-piece temperature and glycol resistant thermoplastic housing, said housing having a sensor portion and a connector portion;
   a sensor element disposed in said the sensor portion of said housing; and
   a pair of terminals connected on one end thereof to said the sensor element and supported in said connector portion of said housing.

3. A temperature sensor as set forth in claim 1 wherein said sensor portion includes a sensor tip, said sensor tip having a configuration conducive to increasing thermal transfer from said sensor tip to said sensor element.

4. A temperature sensor as set forth in claim 3 wherein said configuration of said sensor tip includes a fluted cylindrical portion.

5. A temperature sensor as set forth in claim 1 wherein said sensor portion includes a sensor cavity, said sensor element located in said sensor cavity; and
   a thermally conductive material disposed in said sensor cavity such that said sensor element is surrounded by said thermally conductive material.

6. A temperature sensor as set forth in claim 5 wherein said thermally conductive material includes a room temperature vulcanizing silicone.

7. A temperature sensor as set forth in claim 1 wherein said sensor element is a negative temperature coefficient thermistor.

8. A temperature sensor as set forth in claim 1 wherein said sensor element is a dual terminal thermistor plug.

9. A temperature sensor as set forth in claim 1 wherein said sensor portion includes a sensor cavity;
   said sensor element including a dual terminal thermistor plug, wherein said dual terminal thermistor plug fits within said housing such that a thermistor of said dual terminal thermistor plug is located in said sensor cavity; and
   a thermally conductive material disposed in said sensor cavity such that said thermistor is surrounded by said thermally conductive material.

10. A temperature sensor as set forth in claim 1 including a plurality of threads located on an outer surface of said housing.

11. A temperature sensor as set forth in claim 10 including a microencapsulated thread compound applied to said threads.

12. A temperature sensor as set forth in claim 10 including a seal member located on said housing.

13. A temperature sensor as set forth in claim 1 including a mounting assembly located on said housing.

14. A temperature sensor as set forth in claim 1 including a seal member located on said sensor portion of said housing.

15. A temperature sensor comprising:
    a one-piece plastic housing, said housing having a sensor portion and a connector portion;
    a sensor element disposed in said the sensor portion of said housing; and
    a pair of terminals connected on one end thereof to said the sensor element and supported in said connector portion of said housing;
    said sensor portion having a sensor cavity;
    a negative temperature coefficient thermistor having a pair of leads;
    a terminal assembly including a pair of terminals, said terminals having a connecting end and a mounting end, said mounting ends connected to said leads and a body member supporting said terminals, said body member sized to fit in said connector portion of said housing and having a shoulder, said shoulder engaging an inwardly extending abutment in said housing, wherein said assembly fits in said housing such that said thermistor extends into said sensor cavity of said sensor portion of said housing and said body portion is secured in said connector portion wherein said terminals extend outward toward an open end of said connector portion.

16. A temperature sensor as set forth in claim 15 including a thermally conductive material disposed in said sensor cavity, said material operative to increase the rate of heat transfer to said thermistor.

17. A temperature sensor as set forth in claim 16 including a plurality of threads located on an outer surface of said housing.

18. A temperature sensor as set forth in claim 17 including a microencapsulated thread compound applied to said threads.

19. A temperature sensor comprising:
    a one-piece housing formed of a thermoplastic including a sensor portion and a connector portion, said sensor portion including a sensor cavity;
    a sensor assembly, said assembly including a negative temperature coefficient thermistor, a pair of terminals connected to said thermistor and a body supporting said terminals in a spaced relationship, said body having a shoulder wherein said sensor assembly is placed in said housing such that said thermistor is located in said sensor cavity and said shoulder of said body engages said housing wherein said body supports said terminals in said connector portion.

20. A temperature sensor as set forth in claim 19 including a thermally conductive material disposed in said sensor cavity.

21. A temperature sensor as set forth in claim 19 including said sensor portion having a configuration promoting thermal transfer through said sensor portion of said housing to said thermistor.

22. A temperature sensor as set forth in claim 21 wherein said configuration of said sensor portion includes said sensor portion having a fluted, generally cylindrical portion.

23. A temperature sensor as set forth in claim 19 wherein said sensor assembly includes a dual terminal thermistor plug.

24. A temperature sensor as set forth in claim 19 wherein said housing includes a plurality of threads located on an outer surface thereof.

25. A temperature sensor as set forth in claim 24 including a microencapsulated thread compound applied to said threads of said housing.

26. A temperature sensor as set forth in claim 19 including a mounting assembly located on said housing; and
  a seal member located on said sensor portion of said housing.

27. A temperature sensor comprising:
  a one-piece housing formed of a thermoplastic including a sensor portion and a connector portion, said sensor portion including a sensor cavity, said sensor portion further including a sensor tip having a shape configured to promote thermal transfer through said sensor portion of said housing;
  a sensor assembly, said assembly including a negative temperature coefficient thermistor, a pair of terminals connected to said thermistor and a body portion supporting said terminals in a spaced relationship wherein said sensor assembly is placed in said housing such that said thermistor is located in said sensor cavity and said body member engages said housing and supports said terminals in said connector portion;
  a thermally conductive material disposed in said sensor cavity
  said housing includes a plurality of threads; and
  a microencapsulated thread compound located on said threads.

28. A temperature sensor as set forth in claim 27 wherein said shape of said sensor tip includes a fluted, generally cylindrical portion.

* * * * *